(12) United States Patent
Kollar et al.

(10) Patent No.: US 8,011,631 B2
(45) Date of Patent: Sep. 6, 2011

(54) VIBRATION RESISTANT FASTENER

(75) Inventors: Jan Gregus Kollar, Skalica (SK); Eric Neal Sheppard, Canton, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 109 days.

(21) Appl. No.: 12/395,696

(22) Filed: Mar. 1, 2009

(65) Prior Publication Data

US 2010/0219316 A1 Sep. 2, 2010

(51) Int. Cl.
*F24H 9/06* (2006.01)
(52) U.S. Cl. ....... 248/232; 248/213.3; 165/67; 180/68.4
(58) Field of Classification Search .................. 248/560, 248/608, 609, 638, 213.3, 232, 314; 165/67, 165/69; 180/68.4
See application file for complete search history.

(56) References Cited

U.S. PATENT DOCUMENTS

| | | | | |
|---|---|---|---|---|
| 4,196,774 A | * | 4/1980 | Hoffmann | 165/67 |
| 5,195,717 A | * | 3/1993 | Benz et al. | 248/638 |
| 5,833,205 A | * | 11/1998 | Lindbeck | 248/671 |
| 5,996,684 A | * | 12/1999 | Clifton et al. | 165/67 |
| 6,296,236 B1 | * | 10/2001 | Ott | 267/140.11 |
| 6,386,497 B1 | | 5/2002 | Guyomard et al. | |
| 6,491,504 B2 | * | 12/2002 | Nakagaki et al. | 417/363 |
| 6,668,956 B1 | * | 12/2003 | Pelage et al. | 180/68.4 |
| 7,036,617 B2 | | 5/2006 | Harada | |
| 7,117,927 B2 | | 10/2006 | Kent et al. | |
| 7,363,961 B2 | * | 4/2008 | Mori et al. | 165/41 |
| 2006/0202101 A1 | * | 9/2006 | Dickson et al. | 248/638 |
| 2008/0185200 A1 | * | 8/2008 | Streeter | 180/68.4 |

* cited by examiner

*Primary Examiner* — Terrell McKinnon
*Assistant Examiner* — Bradley Duckworth
(74) *Attorney, Agent, or Firm* — Fraser Clemens Martin & Miller LLC; J. Douglas Miller

(57) ABSTRACT

A fastener having a capture body including a cavity formed therein and a retainer clip including an elongate capture support and a pawl for engagement with the capture body. The fastener being resistant to vibration and able to be installed and removed without the use of special tools, while providing consistent fastening through thermal expansion cycles, and supporting assembly "stack-up" tolerances is disclosed.

18 Claims, 3 Drawing Sheets

VIBRATION RESISTANT FASTENER

FIELD OF THE INVENTION

The invention relates to fasteners and more particularly to fasteners resistant to vibrations.

BACKGROUND OF THE INVENTION

Automobiles and other machines may vibrate during normal operation. These vibrations pose design challenges to manufacturers. Fasteners used to assemble various components of the automobile may eventually fail as a result of vibration.

Special tools may be required during installation of components of the automobile to install and remove the fasteners. When a required special tool is unavailable, another tool may be used in an attempt to complete the task. As a result, the fastener may be damaged or the fastener may be destructively removed and replaced.

The automobile and the fasteners used therein are also subjected to extreme temperature variations. A range of temperature from about −20° F. to about 120° F. is typical for most of the fasteners used in the automobile. Since components of the automobile are subjected to repeated expansion and contraction as a result of the temperature variations, the fasteners may become distended and susceptible to failure.

Additionally, geometric variations in individual components of the automobile are tolerated to some degree. A cumulative effect of the geometric variations throughout multiple parts is known as a tolerance "stack-up". The tolerance "stack-up" may result in a misalignment of fasteners.

It would be desirable to provide a fastener resistant to vibration that may be installed and removed without the use of special tools, provides consistent fastening through thermal expansion cycles, and minimizes the effect of assembly tolerance "stack-up".

SUMMARY OF THE INVENTION

Presently provided by the invention, a fastener resistant to vibration that may be installed and removed without the use of special tools, provides consistent fastening through thermal expansion cycles, and minimizes the effect of assembly tolerance "stack-up", has surprisingly been discovered.

In one embodiment, the fastener comprises a capture body having a cavity formed therein, and a retainer clip at least partially disposed in the cavity of the capture body, the retainer clip having an capture support and a resilient member, the retainer clip releasably secured to the capture body by engagement of the resilient member with the capture body.

In another embodiment, the fastener comprises a capture body having a cavity formed therein and at least one tab covering at least a portion of the cavity, and a retainer clip having an elongate capture support and a resilient member upon which a pawl is disposed, the retainer clip at least partially disposed in the capture body, wherein the elongate capture support covers at least a portion of the cavity, the retainer clip releasably secured to the capture body by engagement of the pawl with the capture body.

In another embodiment, a mounting system for a system component comprises a mounting structure, a capture body having a cavity formed therein and at least one tab covering at least a portion of the cavity, the capture body disposed on the mounting structure, a system component disposed adjacent the mounting structure, the component having at least one mounting point, the mounting point at least partially disposed in the cavity, and a retainer clip having an elongate capture support and a resilient member upon which a pawl is disposed, the retainer clip at least partially disposed in the capture body, wherein the elongate capture support abuts the system component, the elongate capture support covering at least a portion of the cavity, the retainer clip releasably secured to the capture body by engagement of the pawl with the capture body.

BRIEF DESCRIPTION OF THE DRAWINGS

The above, as well as other advantages of the present invention, will become readily apparent to those skilled in the art from the following detailed description of embodiments of the invention when considered in the light of the accompanying drawings in which.

DETAILED DESCRIPTION OF EXEMPLARY EMBODIMENTS OF THE INVENTION

The following detailed description and appended drawings describe and illustrate an embodiment of the invention. The description and drawings serve to enable one skilled in the art to make and use the invention, and are not intended to limit the scope of the invention in any manner.

Figure 1:
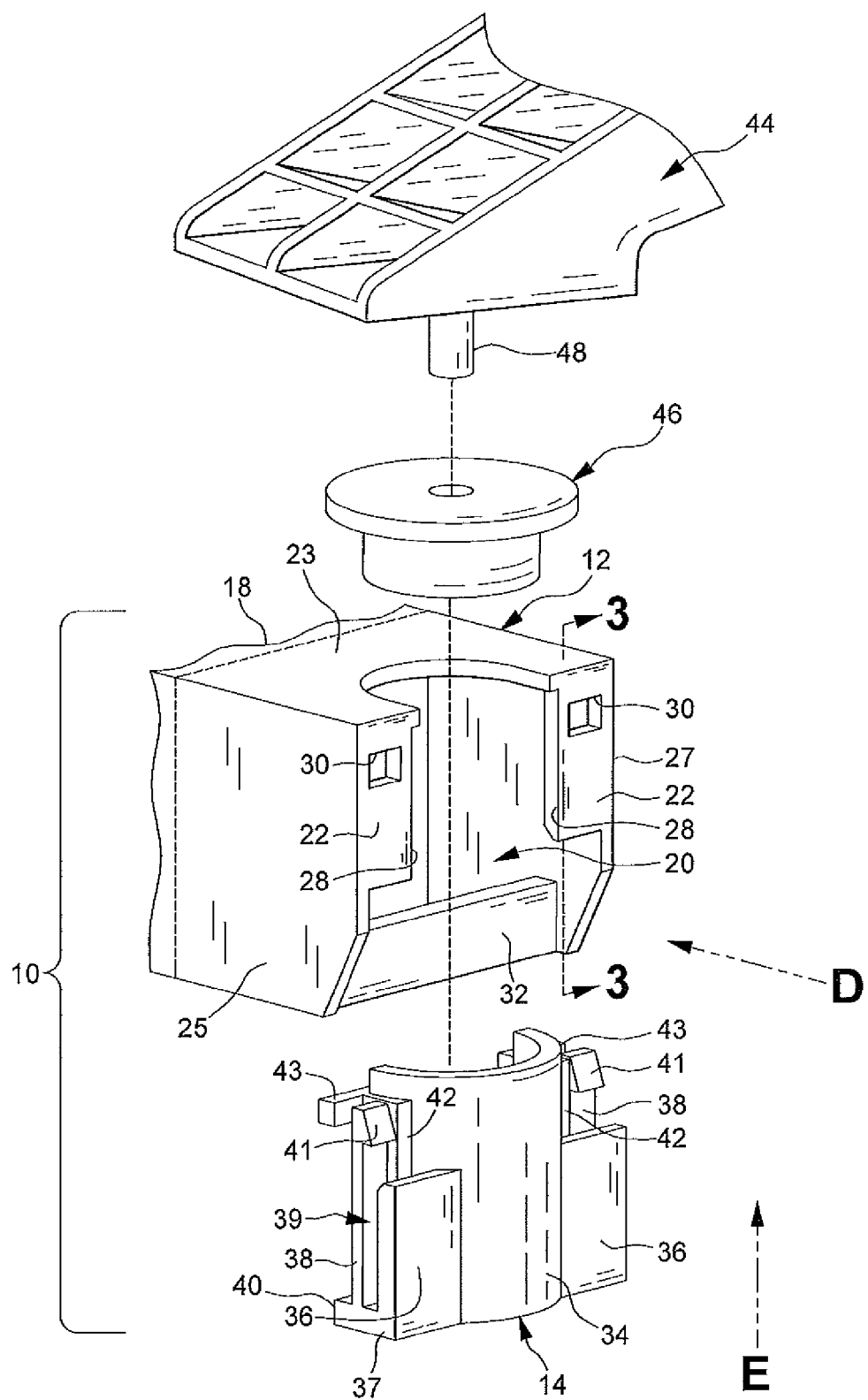
FIG. 1 is an exploded perspective view of a fastener and a system component according to an embodiment of the present invention.
Figure 2:
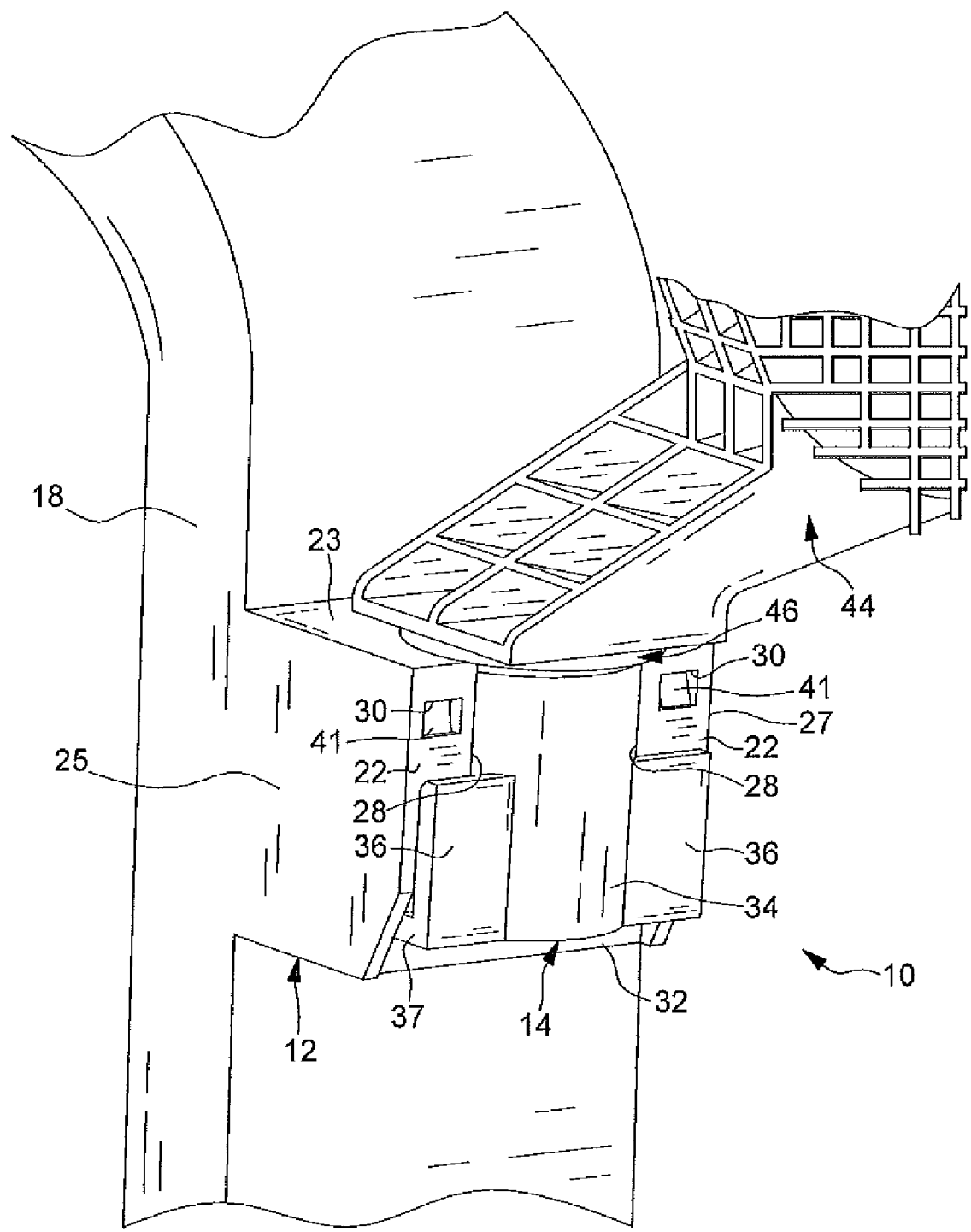
FIG. 2 is a perspective view of the fastener and the system component illustrated in FIG. 1 shown assembled.
Figure 3:
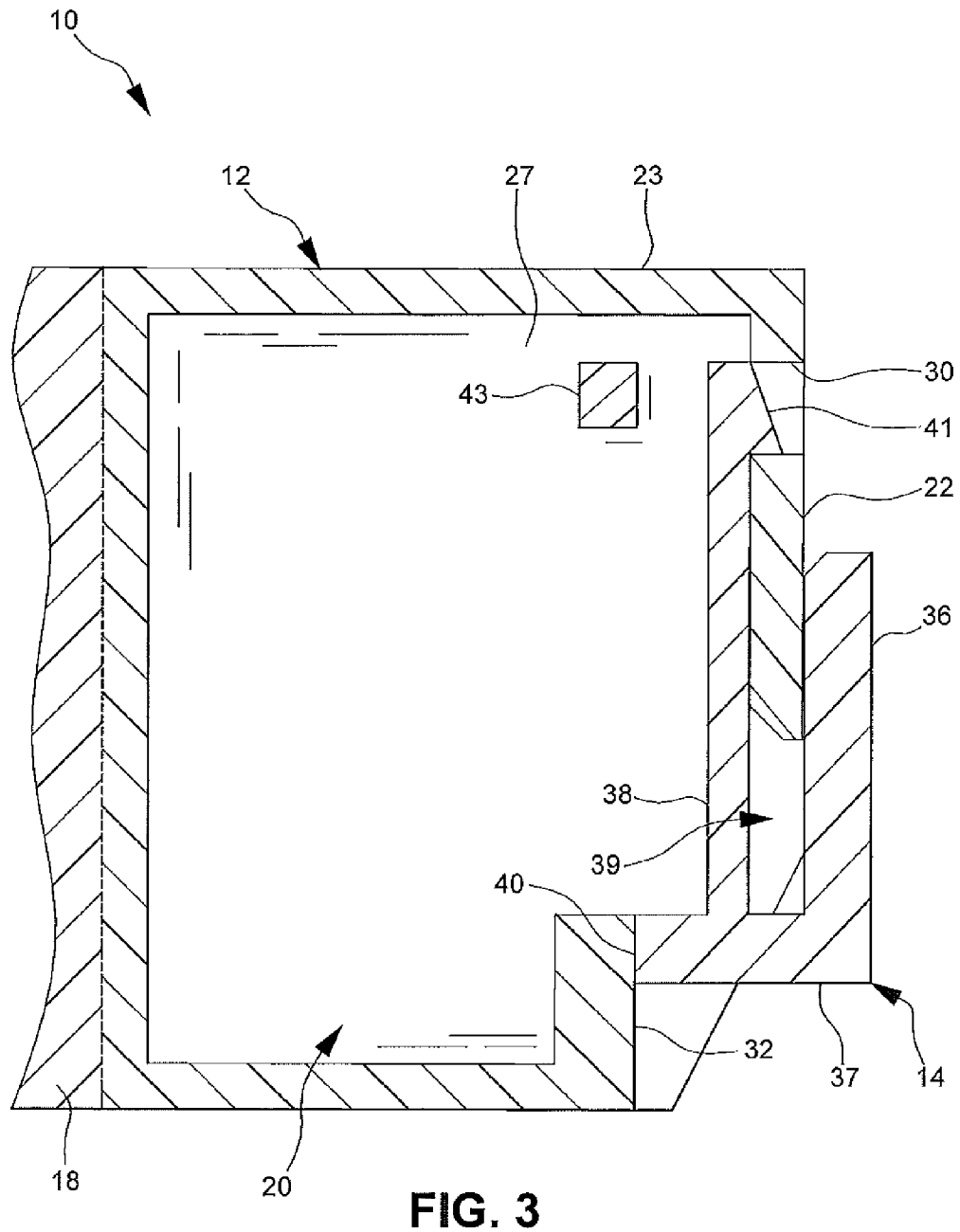
FIG. 3 is a cross-sectional view of the capture body illustrated in FIG. 1 taken along line 3-3 and including a retainer clip disposed therein as illustrated in FIG. 2.

FIGS. 1-3 illustrate a fastener 10 according to the present invention. The fastener 10 includes a capture body 12 and a retainer clip 14.

As shown, the capture body 12 is substantially rectangular and is integrally formed with a mounting structure 18. The mounting structure 18 may be disposed in a vehicle or other structure upon which other components are attached. A cavity 20 is formed in the capture body 12. A pair of tabs 22 partially enclose the cavity 20. The tabs 22 extend laterally inwardly from an upper wall 23 and one of a first side wall 25 and a second side wall 27 of the capture body 12. A pair of spaced apart inner edges 28 of the tabs 22 are substantially parallel and form an opening therebetween into the cavity 20. An aperture 30 is formed in each of the tabs 22 adjacent a first end thereof. A second end of each of the tabs 22 includes a chamfer formed on an inner surface thereof. A support wall 32 extends between the first side wall 25 and the second side wall 27 adjacent lower ends thereof. The capture body 12 shown is formed from an injection molded plastic such as polycaprolactam, for example. In certain embodiments, the capture body 12 is a glass fiber reinforced fastener, a typical range of the glass fiber content being from about 0 to about 10 percent of the material used to form the capture body 12. It is understood that the capture body 12 may be reinforced by other materials. It is further understood the capture body 12 may be formed from other materials, as desired.

The retainer clip 14 includes an elongate capture support 34. The elongate capture support 34 has a substantially arcuate cross-sectional shape adapted to be at least partially disposed in the cavity 20 formed in the capture body 12. A pair of spaced apart capture tabs 36 is formed on the elongate capture support 34. The capture tabs 36 are formed on opposing sides of the elongate capture support 34. Each of the capture tabs 36 terminates at a free end spaced from a base 37 adjacent a first end of the elongate capture support 34. A chamfer is formed on the free end of each of the capture tabs 36. A resilient member 38 extends from each base 37 substantially parallel with the capture tabs 36. FIG. 1 illustrates the retainer clip 14 having two resilient members 38, but any number of members 38 may be used. Each of the resilient members 38 is spaced from the respective capture tab 36 to form a capture area 39 therebetween. The capture area 39 is adapted to receive a respective one of the tabs 22 therein. The base 37 includes an abutment surface 40, adapted to abut the support wall 32 when the fastener 10 is assembled. A pawl 41 is formed on a distal end of each of the resilient members 38 spaced from the base 37. Each of the pawls 41 are adapted to be respectively received in the apertures 30 formed in the tabs 22. As shown, the pawl 41 is a substantially trapezoidal shape, but other shapes may be used such as triangular or arcuate shapes. A pair of guide walls 42 is disposed on opposing sides of the elongate capture support 34. Each of the guide walls 42 is interposed between the resilient member 38 and the elongate capture support 34. A pair of laterally outwardly extending shoulders 43 is formed on opposing sides of the elongate capture support 34 adjacent a second end thereof.

As shown, the retainer clip 14 is of a unitary design. Alternately, the retainer clip 14 may be formed from separate components and coupled together using any conventional means, such as a fasteners or an adhesive. The retainer clip 14 shown is formed from an injection molded plastic such as polycaprolactam, for example. It is understood the retainer clip 14 may be formed from other materials. In certain embodiments, the retainer clip 14 is a glass fiber reinforced fastener, a typical range of the glass fiber content being from about 0 to about 10 percent of the material used to form the retainer clip 14. It is understood that the retainer clip 14 may be reinforced by other materials. It is further understood the retainer clip 14 may be formed from other materials, as desired.

The fastener 10 is used with a system component 44 and a resilient mount 46, as shown in FIGS. 1 and 2. The system component 44 may be any system component, such as a heat exchanger, a motor, a fan housing, a section of ducting, a control means, a charge air cooler, or the like. The system component 44 is formed from any suitable material such as a plastic, a metal, or the like and includes at least one mounting point 48.

The resilient mount 46 is a stepped cylinder having a central bore formed therethrough, but other shapes such as a stepped rectangular mount or a stepped elliptical mount may be used. The resilient mount 46 is formed from a resilient material such as EPDM, butyl rubber, or any other suitable material. The resilient mount 46 is adapted to be received in at least a portion of the cavity 20. The resilient mount 46 may be coupled to the mounting point 48 by a friction fit, an adhesive, or other means.

To assemble the fastener 10, the resilient mount 46, the mounting point 48, and the retainer clip 14 are disposed in the capture body 12. The resilient mount 46 is aligned with and inserted into the cavity 20 of the capture body 12. The capture body 12 includes an installation direction D, indicated in FIG. 1. The direction D represents a movement the system component 44 follows to dispose the mounting point 48 and the resilient mount 46 in the cavity 20.

The capture areas 39 are adapted to slidably receive the tabs 22. When the retainer clip 14 is disposed in the capture body 12, each of the guide walls 42 abuts an inner surface of the tabs 22. Concurrently, the capture tab 36 abuts an outer surface of the tabs 22. The direction E represents a movement the retainer clip 14 follows to engage the capture body 12, securing the system component 44 and the resilient mount 46. An elastic deformation of the resilient member 38 permits the pawl 41 to be received in the aperture 30, securing the capture body 12. The pawl 41 having the substantially trapezoidal shape is advantageous to assembly of the fastener 10. An abutment of the pawl 41 and the chamfer formed on the inner surface of the tab 22 facilitates the elastic deformation of the resilient member 38. After the pawl 41 is received by the aperture 30, the resilient member 38 straightens, substantially abutting the tabs 22 and completing assembly of the fastener 10, as illustrated in FIG. 2. The abutment surface 40 and the support wall 32 cooperate to provide support for the retainer clip 14 when the fastener 10 is assembled. Likewise during disassembly of the fastener 10, the elastic deformation of the resilient member 38 permits the retainer clip 14 to be removed from the capture body 12.

The shoulders 43 are abutted against the support wall 32 during one of fastener 10 assembly and disassembly. Abutment of the shoulders 43 and the support wall 32 provides a tactile feedback to a user of the fastener 10. The feedback informs the user to one of engage and disengage the retainer clip 14 with the capture body 12. Further, the shoulders 43 militate against an overextension of the resilient member 38 (which may cause a permanent deformation thereof) during disassembly of the fastener 10.

The assembled fastener 10 is illustrated in FIGS. 2 and 3, with the pawl 41 disposed in the aperture 30 which releasably secures the retainer clip 14. Upon engaging the retainer clip 14 in the capture body 12, the resilient mount 46 abuts the elongate capture support 34 and militates against movement of the system component 44 and resilient mount 46 in a direction opposing the direction D. It is understood that a plurality of fasteners 10 may be used to secure the system component 44.

In use, a selective arrangement of a plurality of the mounting points 48 is advantageous to obtain proper restraint when the system component 44 is secured solely by means of multiple fasteners 10. The fastener 10 may be used in conjunction with any other conventional fastening method such as threaded fasteners, pins, clips, or the like. As a non-limiting example, at least two fasteners 10 may be arranged parallel, perpendicularly, or obliquely on the system component 44 to adequately restrain the component 44. As a second non-limiting example, at least two fasteners 10 may be arranged to only permit a unidirectional installation of the system component 44. Further, an installation space of the system component 44 may be limited, making a unidirectional installation highly advantageous in restrictive areas such as engine compartments, vehicle interiors, trim panels, and the like.

The retainer clip 14 may be engaged and disengaged without the use of special tools. A user of the fastener 10 is merely required to dispose the components appropriately to secure the system component 44. To release the retainer clip 14 from the capture body 12, the user must remove the pawl 41 from the aperture 30 and displace the retainer clip 14 in a motion opposite the direction E. The pawl 41 may be removed from the aperture 30 by the user simultaneously applying a force to the retainer clip 14 in a motion opposite the direction E while inserting a releaser into the aperture 30. The releaser may be any object having a width smaller than the aperture 30 and having a length sufficient to remove the pawl 41 from the aperture 30. As non-limiting examples, the releaser may be one of an elongate fastener, a length of rigid material, a writing instrument, a tool not specified for sole use as the releaser, or the like. The user of the fastener 10 may be of any skill level and may have few, if any resources typically required in the art for such installation and removal because no special tools are required to disengage the retainer clip 14 from the capture body 12.

The fastener 10 according to the invention provides consistent fastening through thermal expansion cycles. The fastener 10 has a thermal conductivity value significantly lower than a thermal conductivity value of the conventional fastener. A low thermal conductivity value of the fastener 10 militates against subjugation of the fastener 10 to the thermal expansion cycle during short exposures to temperature variation. Accordingly, the low thermal conductivity value of the fastener 10 minimizes a number of thermal expansion cycles the fastener 10 is exposed to.

The fastener 10 in accord with the present disclosure supports "stack-up" tolerances difficult to achieve using the conventional fastener. Inclusion of the resilient mount 46 in the fastener permits greater variation of location of the component 44 in any direction. Particularly, a direction substantially parallel to an axis of the stepped cylinder of the resilient mount 46 permits the greatest amount of variation. The selective arrangement of multiple fasteners 10 permits fastening of the component 44 having geometric variations that would result in a misalignment of the conventional fastener.

Unlike the conventional threaded fasteners used in automotive applications, the fastener 10 is not subject to a gradual loosening caused by vibration. The conventional threaded fastener may require intermittent "tightening" or replacement as a result of the vibration. The resilient mount 46 absorbs at least a portion of a vibration caused by a normal operation of the vehicle or other assembly in which the fastener 10 is incorporated. Further, the resilient mount 46 minimizes a noise associated with the vibration of the fastener 10. Accordingly, the fastener 10 in accord with the present invention provides a substantially quiet and maintenance free operating life.

From the foregoing description, one ordinarily skilled in the art can easily ascertain the essential characteristics of this invention and, without departing from the spirit and scope thereof, make various changes and modifications to the invention to adapt it to various usages and conditions.

We claim:

1. A fastener comprising:
   a capture body having a cavity formed therein and a tab covering at least a portion of the cavity, wherein the tab has an outer surface with an aperture formed therein and through the tab; and
   a retainer clip at least partially disposed in the cavity of the capture body, the retainer clip having a capture support, a resilient member, and a capture tab disposed adjacent the capture support, the retainer clip releasably secured to the capture body by engagement of the resilient member with the capture body, wherein the capture tab abuts the outer surface of the tab of the capture body when the retainer clip is releasably secured to the capture body.

2. The fastener according to claim 1, wherein the resilient member includes a pawl disposed thereon.

3. The fastener according to claim 1, wherein the retainer clip includes a guide wall disposed on the capture support, the guide wall abutting an inner surface of the tab when the retainer clip is at least partially disposed in the cavity of the capture body.

4. The fastener according to claim 1, wherein the retainer clip includes a shoulder disposed thereon adjacent the resilient member.

5. The fastener according to claim 1, wherein the capture body includes a support wall covering at least a portion of the cavity.

6. The fastener according to claim 1, wherein the capture body is disposed on a mounting structure.

7. The fastener according to claim 1, wherein at least one of the capture body and the retainer clip is formed from an injection molded plastic.

8. The fastener according to claim 7, wherein the at least one of the capture body and the retainer clip is formed from polycaprolactam.

9. The fastener according to claim 1, wherein at least one of the capture body and the retainer clip is glass fiber reinforced.

10. A fastener comprising:
    a capture body having a cavity formed therein and at least one tab covering at least a portion of the cavity, wherein the tab has an outer surface with an aperture formed therein and through the tab; and
    a retainer clip having an elongate capture support, a capture tab disposed adjacent the elongate capture support, and a resilient member upon which a pawl is disposed, the retainer clip at least partially disposed in the capture body, wherein the elongate capture support covers at least a portion of the cavity, the retainer clip releasably secured to the capture body by engagement of the pawl with the aperture of the capture body, wherein the capture tab abuts the outer surface of the tab of the capture body when the retainer clip is releasably secured to the capture body.

11. The fastener according to claim 10, wherein the retainer clip includes a guide wall disposed on the capture support, the guide wall abutting an inner surface of the tab when the retainer clip is at least partially disposed in the cavity of the capture body.

12. The fastener according to claim 10, wherein at least one of the capture body and the retainer clip is formed from an injection molded plastic.

13. The fastener according to claim 12, wherein at least one of the capture body and the retainer clip is formed from a glass fiber reinforced polycaprolactam.

14. A mounting system for a system component, the mounting system comprising:
    a mounting structure on an automotive system component;
    a capture body having a cavity formed therein and at least one tab covering at least a portion of the cavity, the capture body disposed on the mounting structure, wherein the tab has an outer surface with an aperture formed therein and through the tab;
    a system component disposed adjacent the mounting structure, the component having at least one mounting point, the mounting point at least partially disposed in the cavity; and
    a retainer clip having an elongate capture support, a capture tab disposed adjacent the elongate capture support, and a resilient member upon which a pawl is disposed, the retainer clip at least partially disposed in the capture body, wherein the elongate capture support covers at least a portion of the cavity, the retainer clip releasably secured to the capture body by engagement of the pawl with the aperture of the capture body, wherein the capture tab abuts the outer surface of the tab of the capture body when the retainer clip is releasably secured to the capture body.

15. The mounting system according to claim 14, further including a resilient mount disposed on the system component, wherein one of the resilient mount and mounting point are at least partially disposed in the capture body.

16. The mounting system according to claim 15, wherein the resilient mount is formed from one of EPDM and butyl rubber.

17. The mounting system according to claim 14, wherein the automotive system component is a heat exchanging device.

18. The mounting system according to claim 17, wherein the heat exchanging device is a charge air cooler.

* * * * *